United States Patent
Takahashi et al.

(10) Patent No.: US 12,068,633 B2
(45) Date of Patent: Aug. 20, 2024

(54) VEHICLE-MOUNTED POWER SUPPLY SYSTEM

(71) Applicant: Imasen Electric Industrial Co., Ltd., Inuyama (JP)

(72) Inventors: Masayoshi Takahashi, Inuyama (JP); Daisuke Makio, Inuyama (JP)

(73) Assignee: Imasen Electric Industrial Co., Ltd., Inuyama (JP)

( * ) Notice: Subject to any disclaimer, the term of this patent is extended or adjusted under 35 U.S.C. 154(b) by 93 days.

(21) Appl. No.: 17/605,324

(22) PCT Filed: Jul. 3, 2020

(86) PCT No.: PCT/JP2020/026188
§ 371 (c)(1),
(2) Date: Oct. 21, 2021

(87) PCT Pub. No.: WO2021/020029
PCT Pub. Date: Feb. 4, 2021

(65) Prior Publication Data
US 2022/0181902 A1      Jun. 9, 2022

(30) Foreign Application Priority Data

Jul. 26, 2019   (JP) .............................. 2019-137773

(51) Int. Cl.
*H02J 7/34*     (2006.01)
*B60R 16/03*    (2006.01)
(Continued)

(52) U.S. Cl.
CPC .......... *H02J 7/345* (2013.01); *B60R 16/0315* (2013.01); *B60R 16/033* (2013.01); *H02J 7/16* (2013.01); *H02J 7/0013* (2013.01)

(58) Field of Classification Search
CPC . H02J 7/345; H02J 7/16; H02J 7/0013; B60R 16/0315; B60R 16/033
(Continued)

(56) References Cited

U.S. PATENT DOCUMENTS

| 7,365,516 B2 | 4/2008 | Leyten et al. |
| 2004/0222771 A1 | 11/2004 | Iwata et al. |
| 2014/0103722 A1* | 4/2014 | Namuduri ............. H02J 7/1423 |
| | | 307/38 |

FOREIGN PATENT DOCUMENTS

| CN | 101499678 A | 8/2009 |
| CN | 103635347 A | 3/2014 |

(Continued)

OTHER PUBLICATIONS

International Application No. PCT/JP2020/026188, International Search Report & Written Opinion, 9 pages, Sep. 15, 2020.

(Continued)

*Primary Examiner* — Hal Kaplan

(57) ABSTRACT

A vehicle-mounted power supply system that multiplexes power supplies in a vehicle and reliably supplies power of a voltage varying from a high voltage to a low voltage. The vehicle-mounted power supply system includes a primary power storage device, a secondary power storage device, and a power generation device. The primary power storage device has a high-voltage output terminal and a low-voltage output terminal. The power generation device supplies power to the primary power storage device and the secondary power storage device. The power supply system further includes: a first switch disposed between the power generation device and the primary power storage device; a second switch disposed between the power generation device and the secondary power storage device; and a third switch disposed between the low-voltage output terminal of the (Continued)

primary power storage device and the output terminal of the secondary power storage device.

20 Claims, 6 Drawing Sheets

(51) Int. Cl.
  *B60R 16/033* (2006.01)
  *H02J 7/00* (2006.01)
  *H02J 7/16* (2006.01)

(58) Field of Classification Search
  USPC .................................................. 307/9.1, 10.1
  See application file for complete search history.

(56) References Cited

FOREIGN PATENT DOCUMENTS

| CN | 106004445 | A | | 10/2016 | |
|---|---|---|---|---|---|
| DE | 102014207390 | A1 | | 10/2015 | |
| DE | 102016213603 | A1 | | 1/2018 | |
| EP | 3360719 | A1 | | 8/2018 | |
| GB | 2418402 | A | * | 3/2006 | ............... B60K 6/48 |
| JP | 2008-43116 | A | | 2/2008 | |
| JP | 2016-171637 | A | | 9/2016 | |
| JP | 2018-198519 | A | | 12/2018 | |
| WO | WO-03026125 | A1 | * | 3/2003 | .......... B60L 11/1803 |
| WO | WO-2018147542 | A1 | * | 8/2018 | .............. B60L 1/003 |

OTHER PUBLICATIONS

Chinese Patent Application No. 202080029748.8, First Office Action, 10 pages, May 11, 2023.
Chinese Patent Application No. 202080029748.8, Second Office Action, 10 pages, Oct. 31, 2023.
European Patent Application No. 20846293.7, Extended European Search Report, 6 pages, Aug. 11, 2023.

* cited by examiner

VEHICLE-MOUNTED POWER SUPPLY SYSTEM

CROSS-REFERENCE TO RELATED APPLICATIONS

This application is a national stage of International Patent Application No. PCT/JP2020/026188, filed on Jul. 3, 2020; which claims priority to Japanese Patent Application No. 2019-137773, filed on Jul. 26, 2019; the entire contents of each of which is incorporated by reference herein.

TECHNICAL FIELD

The present technology relates to a vehicle-mounted power supply system. In particular, the present technology relates to a vehicle-mounted power supply system that includes a power generation device and a power storage device and supplies power with two or more different voltages.

BACKGROUND

Vehicle-mountable power storage devices capable of supplying power with a high voltage of 48V or 24V are known in the form of batteries in which a plurality of cells (battery cells) are connected in series. Such high-voltage power storage devices mainly supply power to motors that drive vehicles. Normally, a vehicle equipped with a high-voltage power storage device is also equipped with a separate power storage device that supplies low-voltage power to components of the vehicle's electrical systems, etc.

FIG. 5 schematically shows a configuration of a conventionally known power supply system 101. The power supply system 101 includes a power storage device 102 that supplies power with a high voltage and a power storage device 103 that supplies low-voltage power to a load 106. Each of the power storage devices 102, 103 is powered by a generator 104. A DC-DC converter 105 is arranged between the power storage device 102 and the power storage device 103, and the power storage device 103 side is supplied with stepped-down power.

Power supply systems to be mounted in vehicles need high reliability and durability. There is thus a demand for a configuration which, even if one of the high-voltage power storage device and the low-voltage storage device is malfunctioning, allows for supplying of power from the normally functioning power storage device to resume operation of the vehicle. For example, Japanese Unexamined Patent Application Publication No. 2018-198519 (hereinafter "Patent Document 1") discloses a power supply system including a lithium-ion battery as a high-voltage power storage medium and a lead battery as a low-voltage power storage device. Patent Document 1 discloses a technique for appropriately controlling the vehicle power supply even when a sensor abnormality occurs, by means of a switch control section that controls a conduction state and a cut-off state between the lithium-ion battery and the lead battery.

As disclosed in Patent Document 1, lead storage batteries are widely used as power storage devices to supply low-voltage power. Lead batteries can be produced from cheap materials, and are highly stable power storage devices that can endure discharging of large currents. On the other hand, since lead is used in the electrodes, the power supply system as a whole tends to become heavier. In addition, since sulfuric acid is used as the electrolyte solution, the danger in case of damage has been pointed out. There is therefore a demand for providing a highly reliable power supply system without using a lead battery.

SUMMARY OF THE INVENTION

Problems to be Solved by the Invention

There is a demand for a vehicle-mounted power supply system that is capable of multiplexing power supplies in a vehicle and reliably supplying power of a voltage varying from a high voltage to a low voltage, without using a lead battery.

The invention according to the present technology was made in view of the aforementioned current situation, and has an object of providing a vehicle-mounted power supply system with high reliability and durability which does not use a lead battery.

Means for Solving the Problems

The present technology relates to a vehicle-mounted power supply system. The power supply system according to the present technology includes a primary power storage device having a high-voltage output terminal and a low-voltage output terminal, a secondary power storage device, and a power generation device configured to supply power to the primary power storage device and the secondary power storage device. The power supply system according to the present technology further includes a first switch disposed between the power generation device and the primary power storage device, a second switch disposed between the power generation device and the secondary power storage device, and a third switch disposed between the low-voltage output terminal of the primary power storage device and an output terminal of the secondary power storage device. In some embodiments, the power supply system according to the present technology is characterized in that the power generation device is a power generator provided with an inverter, or a power generator that can output a variable voltage.

In the power supply system according to the present technology, the secondary power storage device may be composed of a lithium-ion battery, an electric double-layer capacitor, or an electrolytic capacitor.

In the power supply system according to the present technology, a fourth switch may be disposed at the output terminal of the secondary power storage device.

Effects of the Invention

In the power supply system according to the present technology, the primary power storage device has a high-voltage output terminal and a low-voltage output terminal, and, during normal operation, the primary power storage device supplies high-voltage power and low-voltage power. Since it is possible to reduce the occasions for the secondary power storage device to supply power, it is possible to reduce the frequency of replacing the secondary power storage device, which allows for the secondary power storage device to be smaller and have a lower capacity.

In the event that the primary power storage device malfunctions, the power supply system according to the present technology turns off the first switch and the second switch to disconnect the primary power storage device, and resumes power supply by means of the power generation device and the secondary power storage device, allowing for stable operation of the vehicle.

The power supply system according to the present technology eliminates the need to provide a redundancy for the primary power storage device, and allows for the secondary power storage device to be smaller and have a lower capacity, which allows for the vehicle to be made lighter while maintaining reliability of the power supply system as a whole.

DETAILED DESCRIPTION

Figure 1:
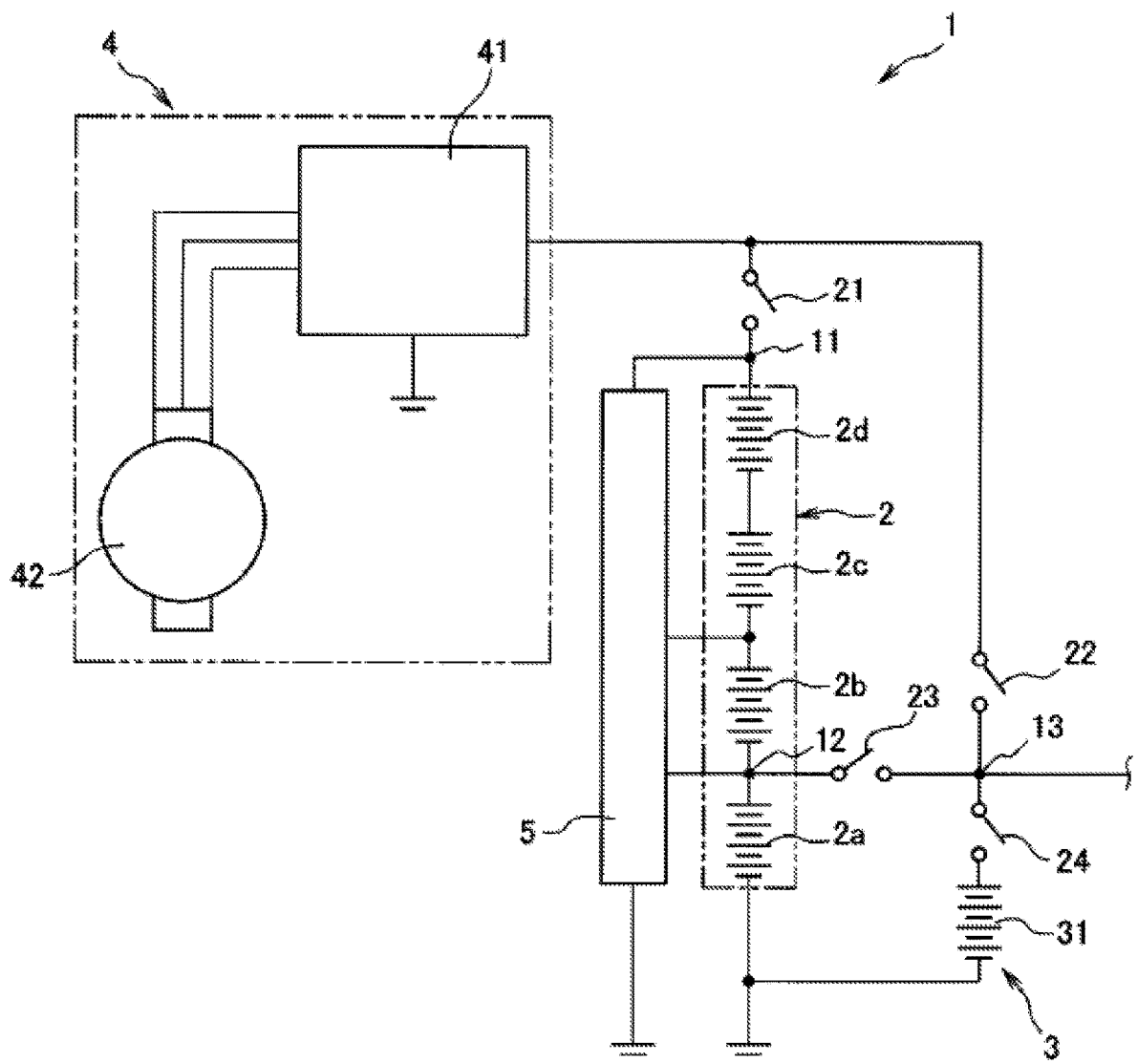
FIG. 1 schematically shows a configuration of a power supply system according to an embodiment of the present technology.

Below, the terminology of the power supply system according to the present technology is first defined, and example embodiments are then described.

According to the present technology, a primary power storage device is a power storage device which supplies power as a main power supply to one or more loads provided to a vehicle. The primary power storage device according to the present technology is provided with a high-voltage output terminal and a low-voltage output terminal so that it can supply power with different voltages to various kinds of loads.

According to the present technology, a secondary power storage device is a power storage device that supplies low-voltage power as an auxiliary power supply during normal operation. On the other hand, in the event that the primary power storage device malfunctions, the secondary power storage device is able to cooperate with the power generation device to supply power with different voltages to various loads.

According to the present technology, a power generation device is a device that includes a power generator and supplies power to the loads and the power storage devices. The term "power generator" as used here means a motor that generates power using regenerative energy, an alternator that generates power using the vehicle engine as a power source, or other power supply devices for vehicles.

An embodiment of a vehicle-mounted power supply system 1, 61 according to the present technology is described below with reference to FIG. 1 and FIG. 2. The power supply system 1 according to the present embodiment includes a primary power storage device 2, a secondary power storage device 3, and a power generation device 4. The difference between the power supply system 1 and the power supply system 61 is the configuration of the secondary power storage device 3.

In one embodiment, the primary power storage device 2 includes a plurality of batteries consisting of a plurality of cells, these batteries being connected in series. In the primary power storage device 2 shown in FIG. 1 and FIG. 2, an embodiment is shown in which four batteries 2a, 2b, 2c, 2d are connected in series. However, the rated voltage of the cells included in the batteries, the number of cells, and the number of batteries to be connected in series in the primary power storage device 2 may be appropriately changed according to the voltage to be supplied. Applicable cells for the primary power storage device 2 include lithium-ion cells, nickel-hydride cells, etc.

The primary power storage device 2 has a high-voltage output terminal 11 and a low-voltage output terminal 12. The high-voltage output terminal 11 is able to supply power with the maximum voltage that can be output, by supplying power from all of the batteries 2a, 2b, 2c, 2d. The low-voltage output terminal 12 controls the output voltage to be low by supplying power from part of the batteries. In FIG. 1 and FIG. 2, power is supplied from the battery 2a.

As shown in FIG. 1, in the power supply system 1, the secondary power storage device 3 may be configured using a single battery 31 including a plurality of cells. Applicable cells for the battery 31 include, as in the primary power storage device 2, lithium-ion cells, nickel-hydride cells, etc.

Figure 2:
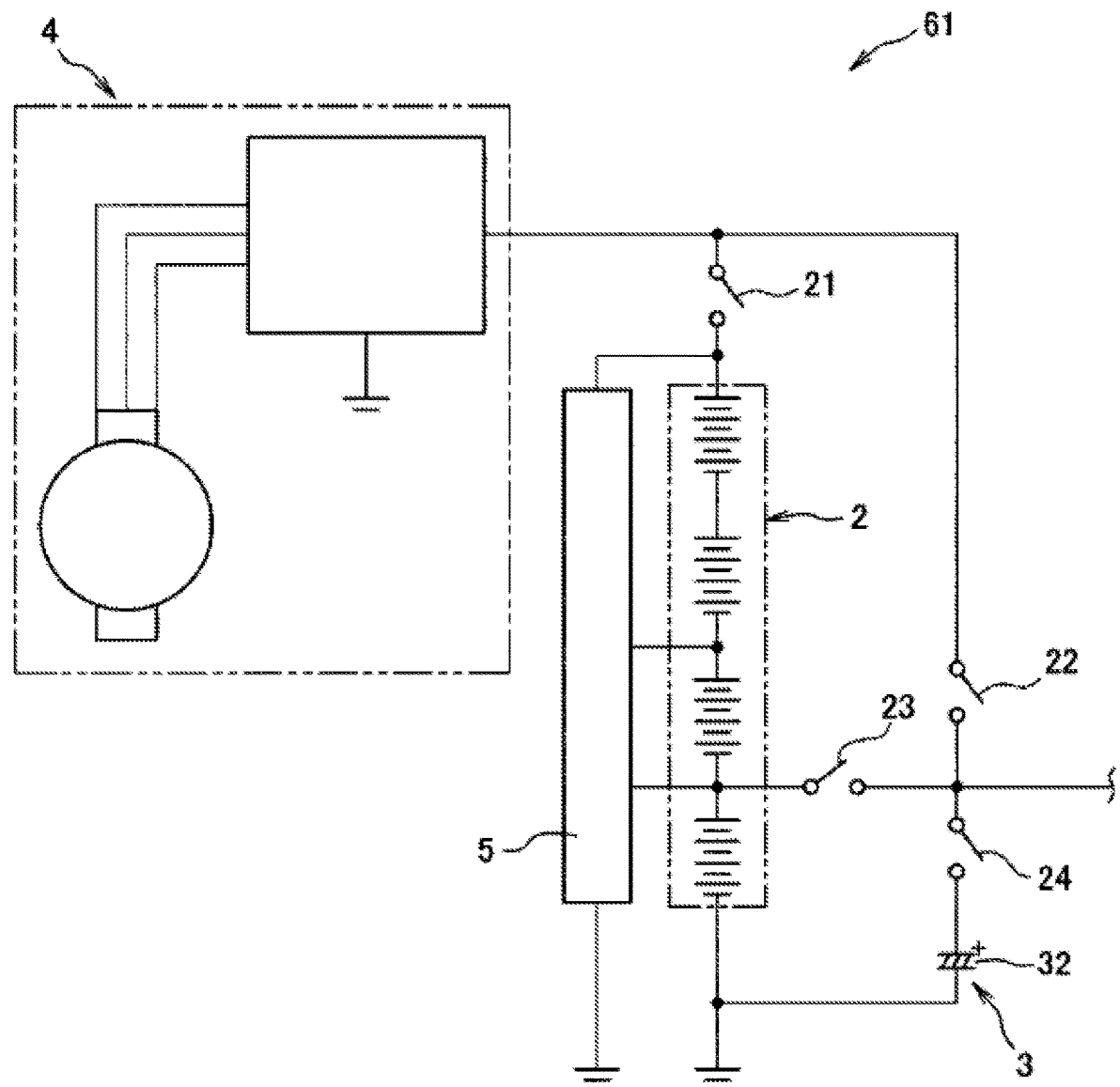
FIG. 2 schematically shows a configuration of a power supply system according to another embodiment of the present technology.

As shown in FIG. 2, in the power supply system 61, the secondary power storage device 3 may be configured using a capacitor 32. An electric double-layer capacitor with high output density and low performance degradation, or a high-capacity electrolytic capacitor may be applied as the capacitor 32.

In another embodiment, the power generation device 4 is provided with a power generator 42 which is provided with an inverter 41. Power output by the power generator 42 is converted into a desired voltage by the inverter 41. The power generation device 4 is able to supply power to the primary power storage device 2 and the secondary power storage device 3, and is further able to supply power to a load in the vehicle not shown here.

Alternatively, the power generation device 4 may be composed of a power generator that can output a variable voltage. In this case, the power generator 4 adjusts the output voltage according to the requirements of the load.

The power supply system 1 according to the present embodiment includes a first switch 21 arranged between the primary power storage device 2 and the power generation device 4, a second switch 22 arranged between the secondary power storage device 3 and the power generation device 4, and further a third switch 23 arranged between the low-voltage output terminal 12 of the primary power storage device 2 and an output terminal 13 of the secondary power storage device 3.

In some embodiments, the power supply system 1 may include a fourth switch 24 at the output terminal of the secondary power storage device 3.

By opening or closing the first switch 21 to the fourth switch 24 by a control means not shown here, the power supply system 1 appropriately changes the power source with respect to each load.

It is desirable that the present embodiment include a balancer 5 which is connected in parallel to all of the batteries 2a, 2b, 2c, 2d of the primary power storage device 2 to form a bypass circuit. As shown in FIG. 1 and FIG. 2, when supplying power from, for example, only battery 2a of the plurality of batteries of the primary power storage device 2 to the secondary power storage device 3 and an external load, it becomes difficult to maintain a balance of voltage and state-of-charge between batteries. The balancer 5 thus performs balancing control of charging and discharging time in order to maintain uniformity of electric potential and state-of-charge of the batteries in the primary power storage device 2, preventing overcharge or overdischarge of the batteries.

EXAMPLES

Below, the configuration and operation of a power supply system 1 in which lithium-ion batteries are applied to the primary power storage device 2 and the secondary power storage device 3 are described in detail with reference to FIGS. 1, 3, and 4. Further, a comparative example in which power sources are not multiplexed is described with reference to FIG. 6.

Example

As shown in FIG. 1, the primary power storage device 2 according to the present Example is provided with four batteries 2a, 2b, 2c, 2d, and each battery includes four lithium-ion cells. In the present Example, lithium-ion cells with an output voltage of 3 V are applied to each of the power storage devices. As a result, the maximum output voltage supplied by the primary power storage device 2 from the high-voltage output terminal 11 is 48 V. Meanwhile, the voltage of the power supplied by the secondary power storage device 3 from the output terminal 24 is 12 V.

Figure 3:
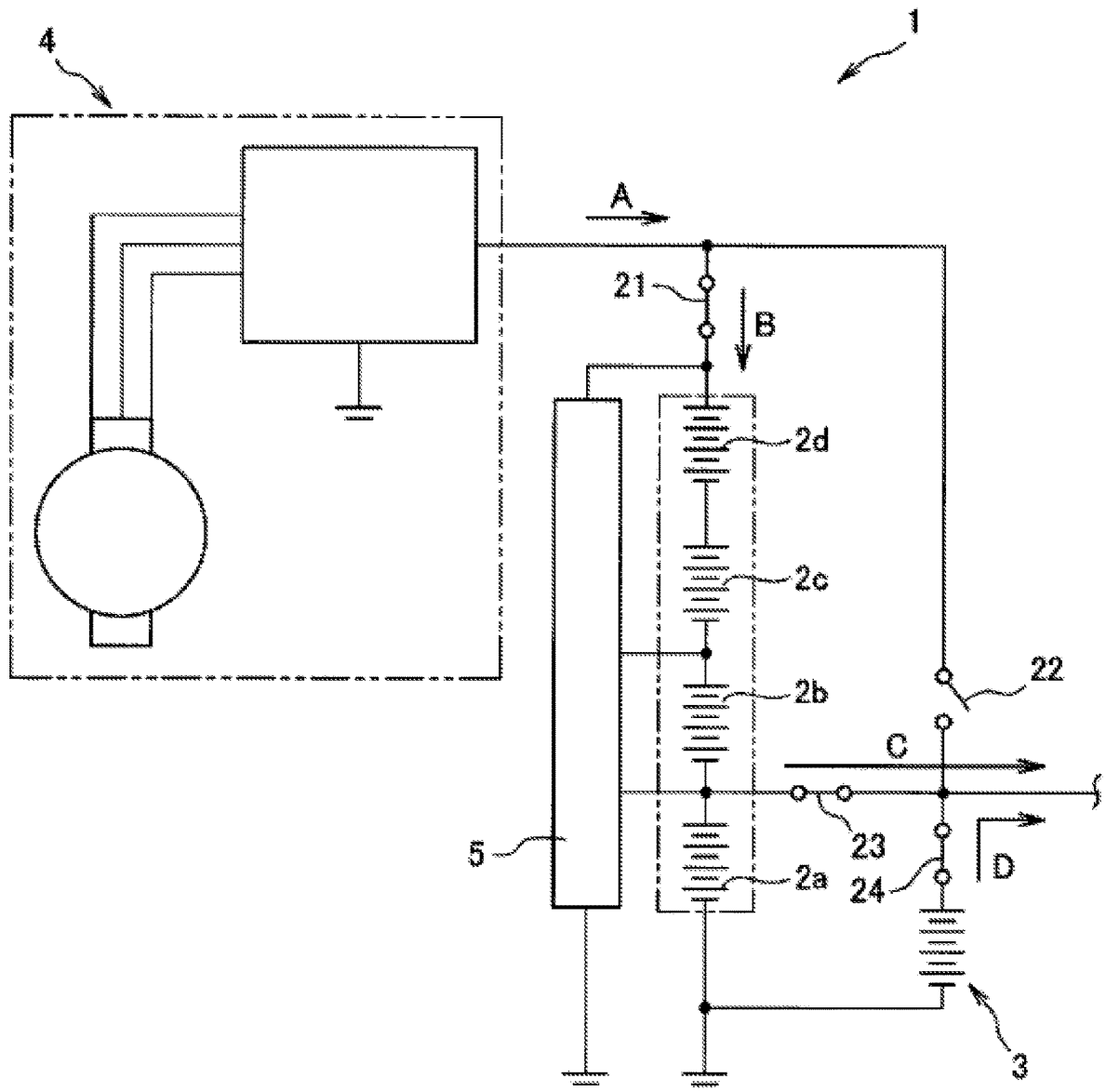
FIG. 3 schematically shows a state of supplying power when a primary power storage device is operating normally.

FIG. 3 schematically shows a configuration and operation of the power supply system 1 when the primary power storage device 2 is operating normally. The power generation device 4 supplies power in the direction indicated by arrow A and arrow B in the drawing, and since the first switch 21 between the primary power storage device 2 and the power generation device 4 is closed, the power generation device 4 charges the primary power storage device 2. In addition, according to the operation conditions of the vehicle, either one of the primary power storage device 2 and the power generation device 4 supplies power to a load requesting high-voltage power.

When the primary power storage device 2 is operating normally, the second switch 22 between the secondary power storage device 3 and the power generation device 4 is open, so that there is no direct connection between the power generation device 4 and the secondary power storage device 3. Meanwhile, the third switch 23 between the low-voltage output terminal 12 of the primary power storage device 2 and the output terminal 13 of the secondary power storage device 3 is closed, and the fourth switch provided at the output terminal of the secondary power storage device is closed. As a result, as indicated by arrow C and arrow D in the drawing, power can be supplied to a load requesting low-voltage power both from the primary power storage device 2 and from the secondary power storage device 3. In addition, it is possible to charge the secondary power storage device 3 via the primary power storage device 2.

When the primary power storage device 2 is operating normally, power can be supplied to a load requesting low-voltage power even in a case where the fourth switch provided at the output terminal of the secondary power storage device is open, as in the case where the fourth switch is closed.

Figure 4:
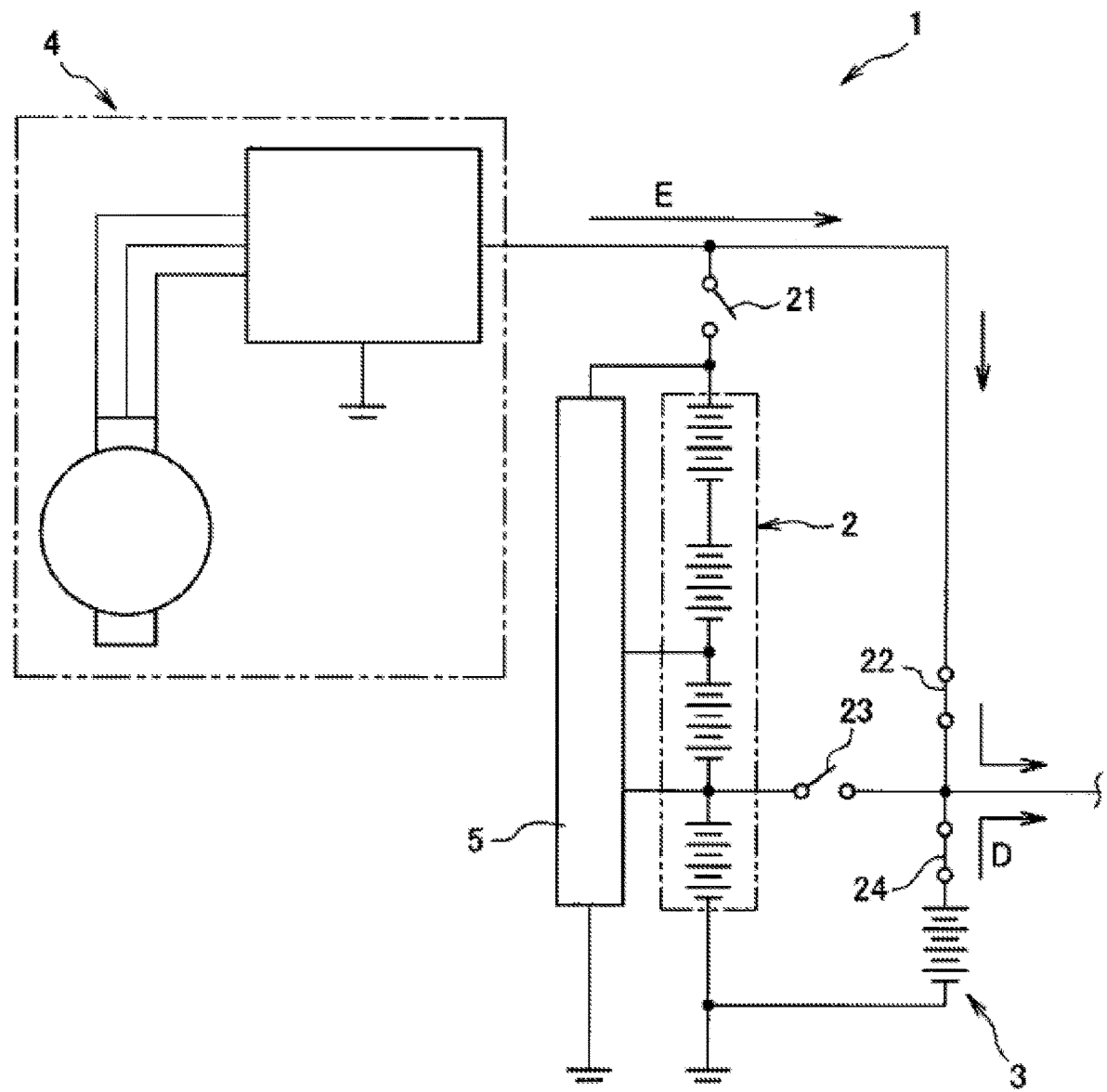
FIG. 4 schematically shows a state of supplying power when the primary power storage device is malfunctioning.
Figure 5:
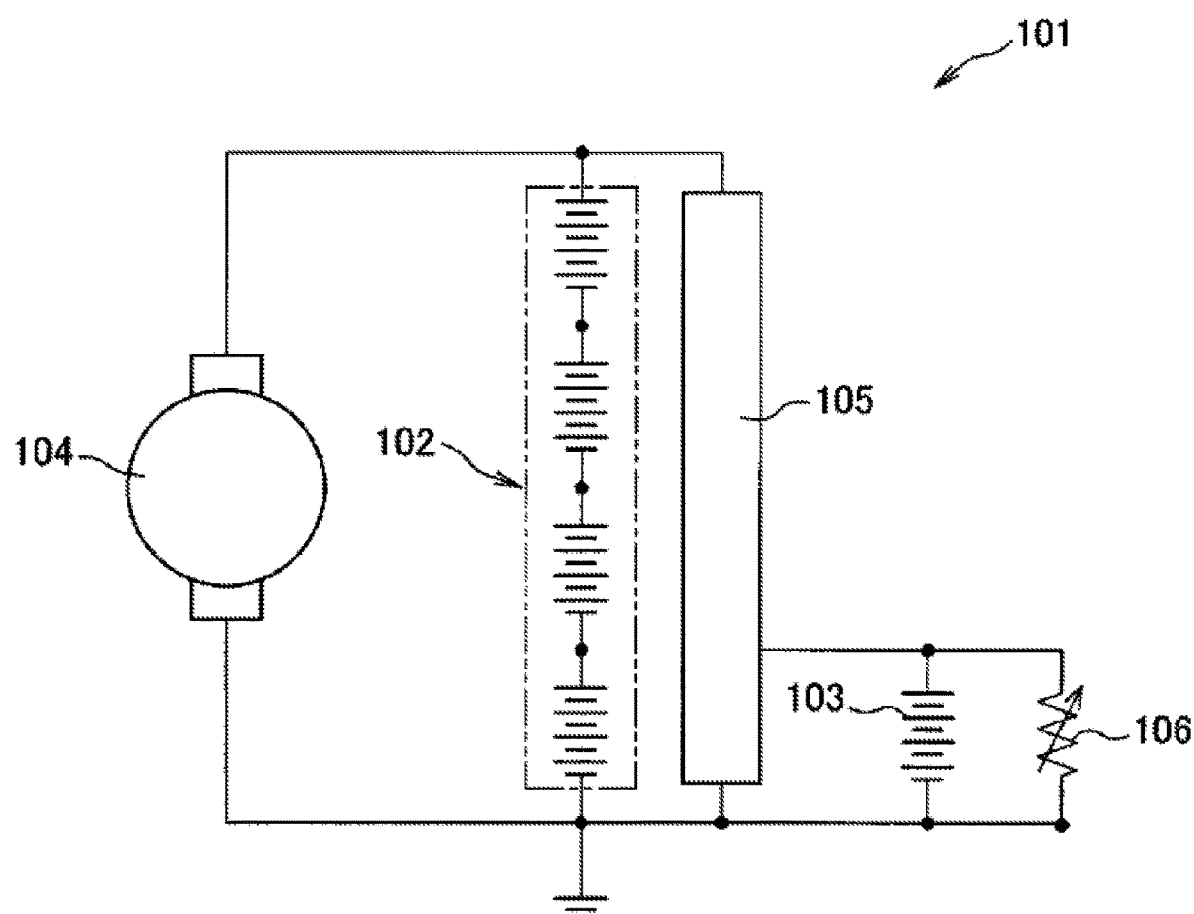
FIG. 5 schematically shows a configuration of a conventional power supply system.

FIG. 4 schematically shows a configuration and operation of the power supply system 1 when the primary power storage device 2 is malfunctioning. The first switch 21 and the third switch 23 are open, so that the primary power storage device 2 is electrically disconnected from the power supply system 1. Meanwhile, the second switch 22 is closed.

Power is supplied from the power generation device 4 in the direction indicated by arrow E in the drawing. In this case, the voltage of the power supplied from the power generation device 4 is adjusted by the inverter 41, whereby power can be supplied to both a load requesting a high voltage and a load requesting a low voltage. It is also possible to supply power from the secondary power storage device 3, which was being charged during normal operation.

In the power supply system 1 according to the present technology, the primary power storage device 2 can normally supply power to both a load requesting high-voltage power and a load requesting low-voltage power, while the secondary power storage device 3 functions as a spare power supply. In the event that the primary power storage device 2 malfunctions, power can be supplied from the secondary power storage device 3 and the power generation device 4 to the load. In this way, the power supply system according to the present technology can multiplex power sources in the vehicle, and can reliably supply respectively high-voltage power and low-voltage power.

Comparative Example

Figure 6:
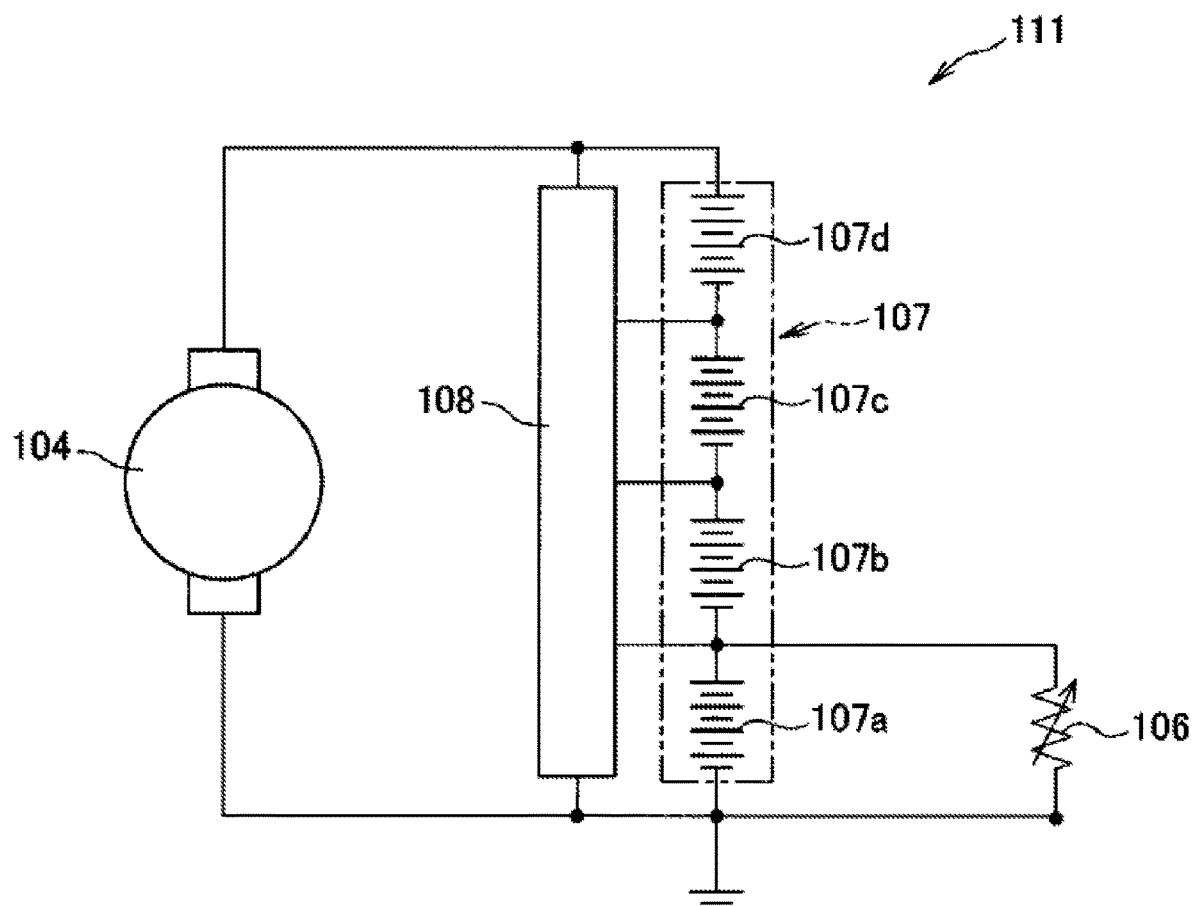
FIG. 6 shows a power supply system according to a comparative example.

FIG. 6 shows a comparative example of a power supply system 111 which does not multiplex power sources. The power supply system 111 of FIG. 6 includes a power generation device 104 and a power storage device 107. The power storage device 107 includes batteries 107a, 107b, 107c, 107d connected in series, and an output terminal is provided between battery 107a and battery 107b. The power storage device 107 can supply low-voltage power by supplying power to the load 106 from only the battery 107a. In addition, when supplying power from all of the batteries 107a, 107b, 107c, 107d, power with a higher voltage can be supplied. The power supply system 111 includes a balancer 108 which is connected in parallel to all of the batteries 107a, 107b, 107c, 107d of the power storage device 107 to form a bypass circuit. The balancer 108 performs charge/discharge control of each of the batteries to prevent overcharge or overdischarge of the power storage device.

The power supply system 111 of the Comparative Example can appropriately supply high-voltage power and low-voltage power with a simple configuration. However, since it supplies power using a single power storage device, there is a risk that power supply will be delayed in the event that the power storage device malfunctions. The power supply systems 1, 61 according to the Example have the feature of being able to supply power with different voltages more reliably, which the Comparative Example does not have.

The configuration of the power supply system described in the Example may be appropriately modified. For example, it is possible to supply power from a plurality of batteries according to the required output voltage and current. In addition, the positions of the switches and types of the cells may be appropriately modified.

INDUSTRIAL APPLICABILITY

The power supply system according to the present technology may be applied to a vehicle. In addition, it may be installed in any industrial equipment that supplies power with different voltages.

DESCRIPTION OF THE REFERENCE NUMERALS

1, 61, 101, 111 Power supply system
2 Primary power storage device 3 Secondary power storage device
4 Power generation device
5 Balancer
2a, 2b, 2c, 2d, 31 Battery
11 High-voltage output terminal
12 Low-voltage output terminal
13 Output terminal
21 First switch
22 Second switch
23 Third switch
24 Fourth switch
31 Power generation device
32 Capacitor
41 Inverter
42 Power generator

The invention claimed is:

1. A vehicle-mounted power supply system comprising:
a primary power storage device having a high-voltage output terminal and a low-voltage output terminal;
a secondary power storage device capable of supplying low-voltage power as an auxiliary power supply;
a power generation device configured to supply power to the primary power storage device and the secondary power storage device;
a first switch coupled to and between the power generation device and the primary power storage device;
a second switch coupled to and between the power generation device and the secondary power storage device; and
a third switch coupled to and between the low-voltage output terminal of the primary power storage device and an output terminal of the secondary power storage device.

2. The power supply system according to claim 1, wherein the secondary power storage device comprises any one of: a lithium-ion battery, an electric double-layer capacitor, and an electrolytic capacitor.

3. The power supply system according to claim 1 further comprising a fourth switch coupled to and between the secondary power storage device and the output terminal of the secondary power storage device.

4. The power supply system according to claim 1, wherein the power generation device comprises: a power generator, and an inverter coupled to and between the power generator and the first switch.

5. The power supply system according to claim 1, wherein the power generation device comprises a power generator configured to output a variable voltage.

6. A vehicle-mounted power supply system comprising:
a primary power storage device having a high-voltage output terminal and a low-voltage output terminal;
a secondary power storage device having an output terminal and including at least one battery, wherein the secondary power storage device is configured to supply low-voltage power as an auxiliary power supply;
a power generation device configured to supply power to the primary power storage device and the secondary power storage device;
a first switch coupled to and between the power generation device and the high voltage output terminal of the primary power storage device;
a second switch coupled to and between the power generation device and the output terminal of the secondary power storage device; and
a third switch coupled to and between the low-voltage output terminal of the primary power storage device and the output terminal of the secondary power storage device.

7. The power supply system according to claim 6, wherein the secondary power storage device comprises a plurality of batteries including the at least one battery.

8. The power supply system according to claim 7, wherein at least one battery of the plurality of batteries includes a plurality of cells.

9. The power supply system according to claim 6, wherein the primary power storage device includes a plurality of batteries, the power supply system further comprising a balancer connected in parallel to all of the plurality of batteries of the primary power storage device.

10. The power supply system according to claim 6, wherein the primary power storage device includes a lithium-ion battery.

11. The power supply system according to claim 6, wherein both the primary and secondary power storage devices include a lithium-ion battery.

12. The power supply system according to claim 6, wherein an output voltage of the primary power storage device is 48 V.

13. The power supply system according to claim 6, wherein an output voltage of the secondary power storage device is 12 V.

14. The power supply system according to claim 6, wherein the power generation device is further configured to charge the primary power storage device when the first switch is in a conducting state and the second switch is in a non-conducting state.

15. The power supply system according to claim 6, wherein the power generation device is further configured to charge the secondary power storage device when the first switch is in a non-conducting state and the second and third switches are in non-conducting states.

16. The power supply system according to claim 6, wherein the secondary power storage device is configured to supply both a load requesting a high-voltage and a load requesting a low-voltage in the absence of any passive inductive circuit components.

17. The power supply system according to claim 6 further comprising a fourth switch coupled to and between the secondary power storage device and the output terminal of the secondary power storage device.

18. The power supply system according to claim 6, wherein, when the primary power storage device is malfunctioning, the first switch and the third switch are in a non-conducting state, the second switch is in a conducting state, and the vehicle-mounted power supply system is configured to supply power from the power generation device to both a load requesting a high-voltage and a load requesting a low-voltage.

19. The power supply system according to claim 6, wherein, when the primary power storage device is malfunctioning, the first switch and the third switch are in a non-conducting state, the second switch is in a conducting state, and the vehicle-mounted power supply system is configured to supply power from the secondary power storage device which was being charged.

20. A vehicle-mounted power supply system comprising:
a primary power storage device including a plurality of batteries and having a high-voltage output terminal and a low-voltage output terminal;

a secondary power storage device having an output terminal, wherein the secondary power storage device is configured to supply low-voltage power as an auxiliary power supply;
a balancer connected in parallel to the plurality of batteries of the primary power storage device;
a power generation device configured to supply power to the primary power storage device and the secondary power storage device;
a first switch coupled to and between the power generation device and the high voltage output terminal of the primary power storage device;
a second switch coupled to and between the power generation device and the output terminal of the secondary power storage device; and
a third switch coupled to and between the low-voltage output terminal of the primary power storage device and the output terminal of the secondary power storage device.

* * * * *